United States Patent [19]

Moatti

[11] 4,373,425

[45] Feb. 15, 1983

[54] HYDRAULIC ENGINE

[76] Inventor: Georges Moatti, 17, rue Gutenberg, 92100 Boulogne sur Seine, France

[21] Appl. No.: 164,907

[22] Filed: Jul. 1, 1980

[30] Foreign Application Priority Data

Jul. 2, 1979 [FR] France ................ 79 17154

[51] Int. Cl.³ ............... F01L 21/04; F01L 21/02; F01L 25/02
[52] U.S. Cl. ................ 91/227; 91/229; 91/306; 91/313
[58] Field of Search ............ 91/227, 229, 226, 306, 91/305, 313

[56] References Cited

U.S. PATENT DOCUMENTS

| | | | |
|---|---|---|---|
| 2,748,712 | 6/1956 | Sargent | 91/229 |
| 2,789,545 | 4/1957 | Dolza et al. | 91/229 |
| 2,820,436 | 1/1958 | Ruegg | 91/227 |

*Primary Examiner*—Paul E. Maslousky

[57] ABSTRACT

Hydraulic engine with piston moving inside a chamber, the working and reversing controls being inside the piston.

Said engine comprises a piston (6) which is provided with an annular chamber (15) into which the fluid is admitted through two conduits (13 and 14). From said chamber (15), the fluid passes through the conduit (17), the groove (19) and the conduit (21) and then through the reversing valve (22a) and from there via the conduits (28,29) into the lower chamber (2a). The fluid contained into the upper chamber (2b) is removed through the conduits (30 and 31) traverses the valve (22a) and arrives through the conduit (32) into the groove (33). It is then removed through the conduit (34) and the chamber (35) surrounding the column (4) towards two exhaust channels (37 and 36).

This engine finds an application in driving the slide valve of a self-cleaning filter.

6 Claims, 8 Drawing Figures

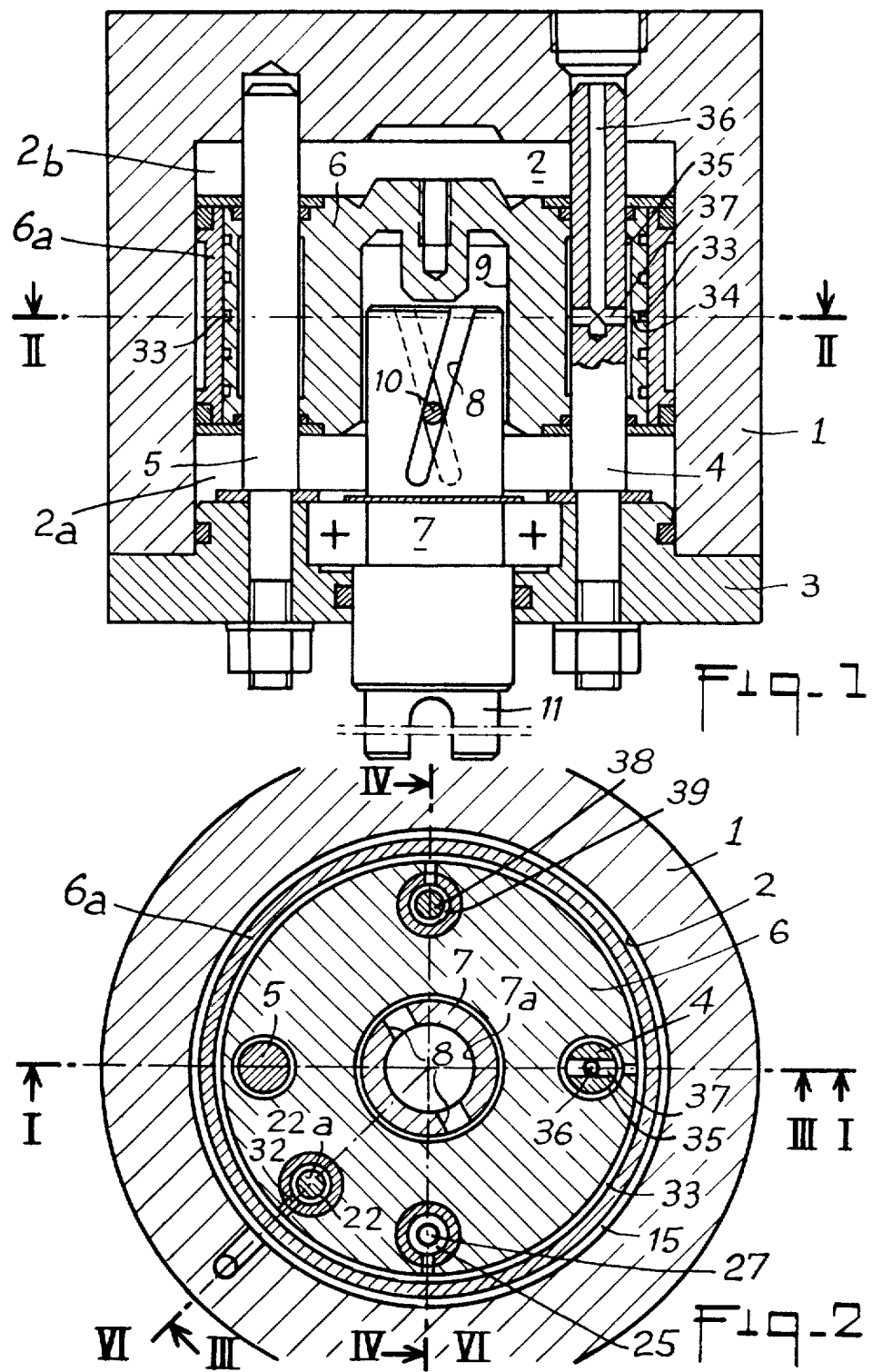

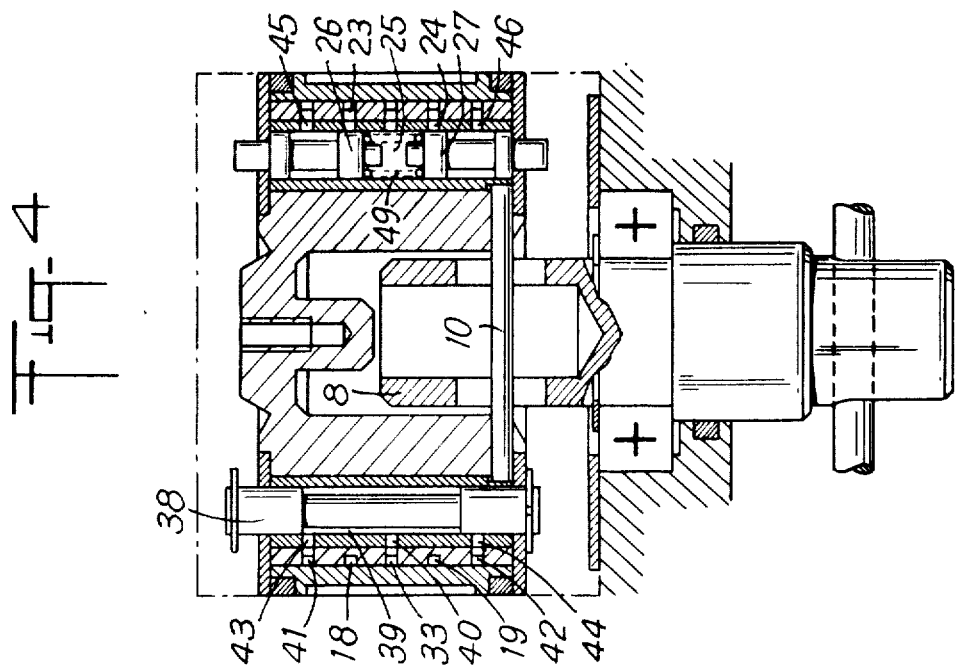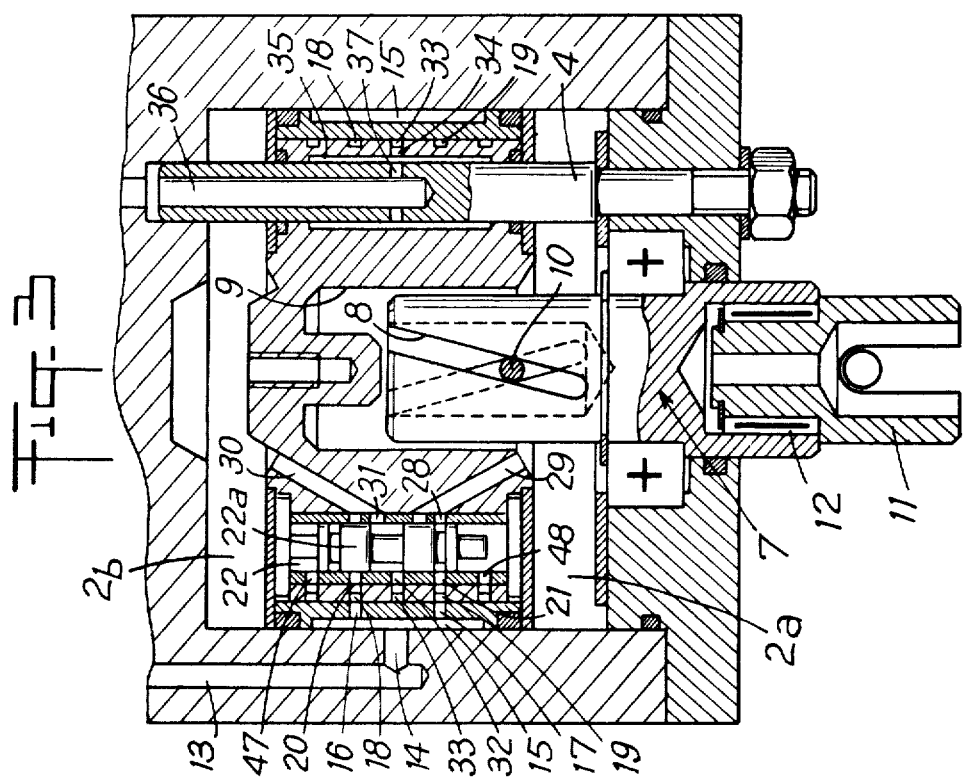

HYDRAULIC ENGINE

The invention relates to a hydraulic engine with a reciprocating piston, intended in particular to drive the rotary valve of a self-cleaning filter. Such engines have already been described in French Patent Nos. 72 26048 and 71 18275, and in U.S. Pat. No. 1,578,199, but their drive members and motive fluid control members are complex and all separated, so that to change certain parts did require very lengthy and difficult dismantlings.

The purpose of this invention is to regroup a great number of parts in the piston proper, in order to facilitate repairs in cases of defect as only the piston then needs to be dismantled.

The object of the invention therefore is a hydraulic engine used in particular to drive a self-cleaning filter, which engine comprises a piston moving with an automatically controlled reciprocating motion, inside a cylinder into the walls of which issue a pressurized hydraulic fluid supply pipe and an exhaust pipe for said hydraulic fluid. The piston defines with the cylinder two chambers, to receive the hydraulic fluid and comprises drive members parallel to the piston axis and sliding therein. The drive members or means ensure the selective and successive communication of the supply pipe and exhaust pipe with each one of the chambers, via a conduit provided inside the piston.

According to the invention, the piston is composed of a central core and a sleeve mounted in sealed manner on said core, the said sleeve being provided on its periphery with at least three annular grooved portions forming with the inside wall of the sleeve, three annular fluid-tight grooves, the middle groove being in permanent communication with the exhaust pipe and the two adjacent grooves being in permanent communication with the supply pipe. The middle groove and one of the two adjacent grooves are selectively and respectively connected with the two chambers of the cylinder via a slide valve mounted in the piston, the outlets of which are connected to each of the two chambers via conduits provided in the core of the piston and issuing on to each of the faces thereof.

The invention will be more readily understood on reading the following description with reference to the accompanying drawings, in which:

FIG. 1 is a cross-section along line I—I of FIG. 2, of an engine according to the invention;

FIG. 2 is a cross-section along line II—II of FIG. 1;

FIG. 3 is a cross-section along line III—III of FIG. 2;

FIG. 8 is an axial cross-section of an engine according to the invention coupled to a self-cleaning filter.

Figure 5:
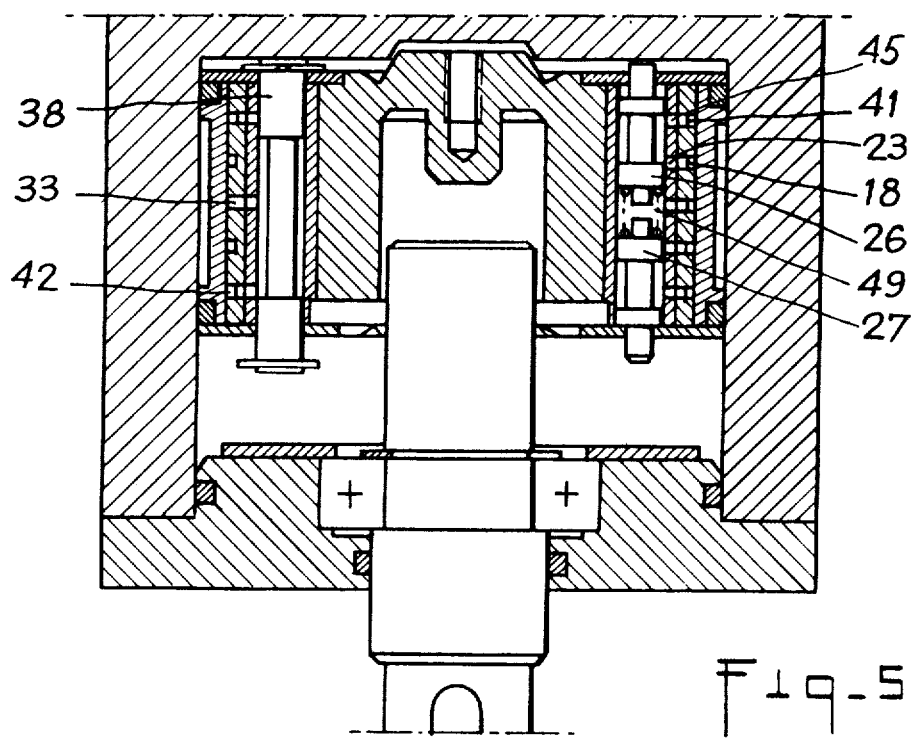
FIG. 5 is a similar view to that of FIG. 4 with the piston in the reversing position.
Figure 6:
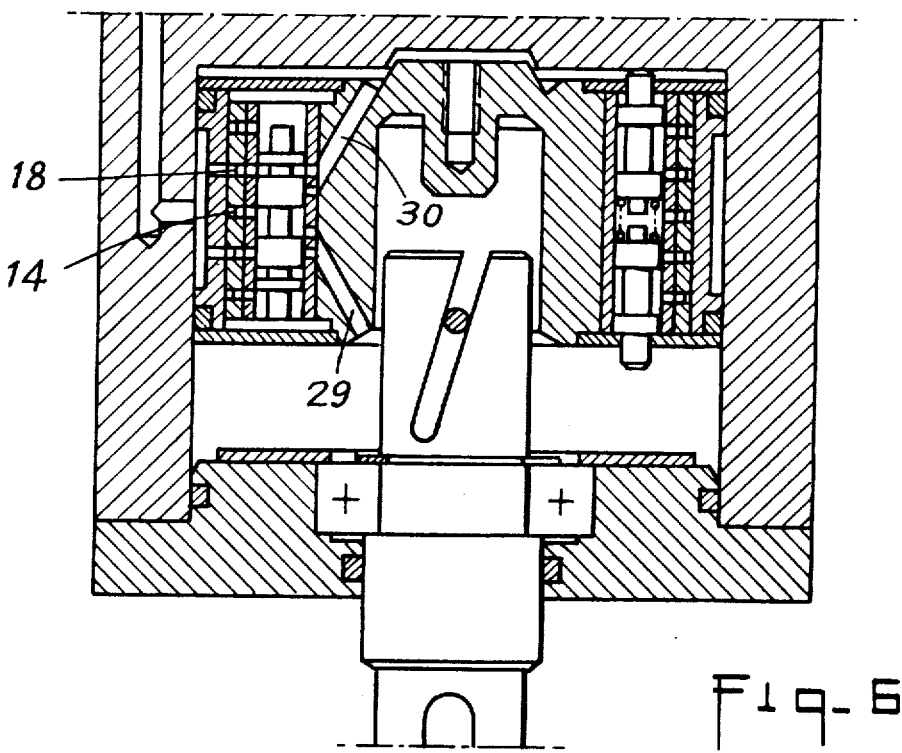
FIG. 6 is a cross-section along line VI—VI of FIG. 2 with the piston in the reversing position.

As illustrated in the drawings, the hydraulic engine comprises a body 1 inside which is provided a chamber 2, closed by a cover 3 held by two columns 4 and 5 forming ties. A piston 6 sliding in the chamber 2 on the columns 4 and 5 defines two chambers 2a and 2b.

In cover 3 is mounted a shaft 7 the inside part of which comprises an axial bore 7a with two skews 8, diametrically opposite, provided in the wall of that part of the hollow shaft which penetrates an axial opening 9 in the piston, a diametrical axis 10 of the piston traversing the two skews. Thus the alternate motion of the piston transmits to the shaft 7 an alternate rotary motion which can cause the unidirectional rotation of a shaft 11 coaxial to the shaft 7 coupled to the latter via a free wheel 12 (FIG. 3).

The motive fluid is admitted through a conduit 13 provided in the body 1 (FIG. 3) and issuing via a conduit 14 into the chamber 2.

The piston is constituted by a core 6 on the periphery of which is tightly fitted a sleeve 6a.

The outer face of the sleeve 6a is provided with an annular groove which constitutes an annular peripheral chamber 15 (FIG. 3) with the inside wall of the chamber 2. In the sleeve are provided two conduits 16 and 17, preferably symmetrical together with respect to the middle plane of the sleeve.

The core 6 of the piston has at least three annular grooved portions forming with the inside wall of the sleeve 6a three annular grooves 33, 18 and 19. The two grooves 18 and 19 are situated opposite conduits 16 and 17 of the sleeve, whereas the groove 33 is situated between the two grooves 18 and 19, and preferably in the median plane of the core 6.

In the example illustrated in FIGS. 1 to 6, the core 6 is provided with two further annular grooved portions forming with the inside wall of the sleeve two annular grooves 41 and 42 situated beyond the grooves 18 and 19 respectively with respect to the middle groove 33.

A cylindrical chamber 22 is provided in the core 6, in parallel to its axis. In the wall of said chamber 22 are provided, on the one hand, a conduit 32 which communicates with the middle groove 33, and on the other hand two conduits 20 and 21 which communicate respectively with the grooves 18 and 19, and finally two conduits 47 and 48 issuing into the grooves 41 and 42.

Moreover, the chamber 22 is connected to each one of the chambers 2a and 2b via conduits 29 and 30 traversing the core 6.

A piston valve 22a slides in the chamber 22 and closes, depending on its position, one of the conduits 20 or 21, whilst, as shown in FIG. 3, causing the conduit 21 (or 20) to communicate with the conduit 29 (or 30) and the conduit 30 (or 31) to communicate with the conduit 33.

A cylindrical chamber 39 similar to chamber 22 comprises a slide valve 38 whose length exceeds the thickness of the core 6. The chamber 39 comprises conduits 40, 43, 44 which communicate respectively with the annular grooves 33, 41 and 42. In every one of its position the slide valve 38 closes one of the conduits 44 (or 43) whilst creating a communication between the conduit 40 and the groove 33.

A cylindrical chamber 25, which is also similar to chamber 22, is equipped with two relaying pistons 26 and 27 between which is provided a spring 49. The ends of said pistons 26 and 27 project outside the core 6.

Figure 4:
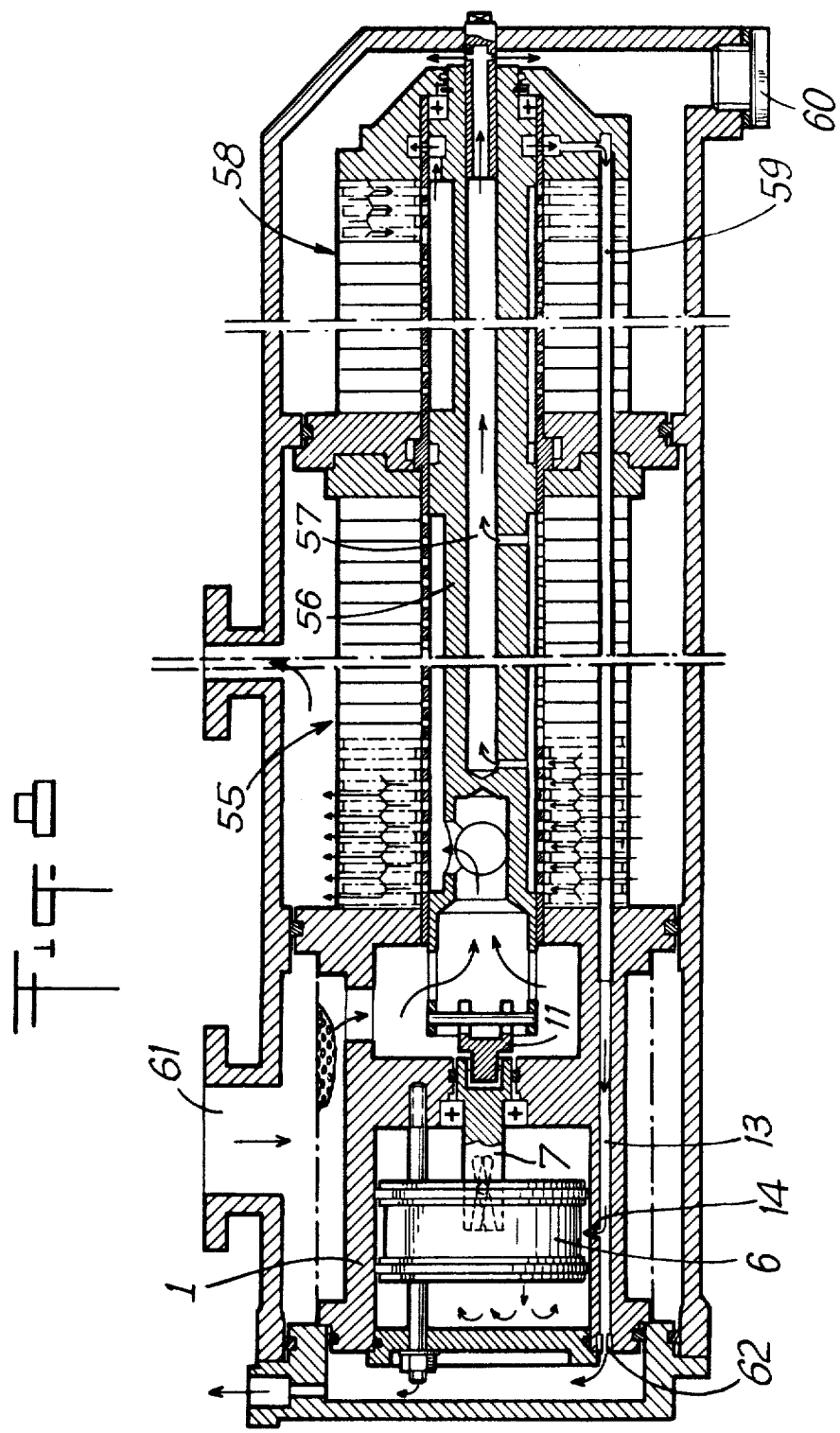
FIG. 4 is a cross-section along line IV—IV of FIG. 3.

The chamber 25 further comprises conduits 23, 24, 45 and 46 which respectively communicate with the annular grooves 18, 19, 41 and 42. In the rest position, which is illustrated in FIG. 4, the relaying pistons 26 and 27 close the conduits 23 and 24 but are adapted to create a communication, respectively, between the conduit 23 and the conduit 45 and between the conduit 24 and the conduit 46 in the position shown in FIGS. 5 and 6.

Finally, a bore is provided in the core 6 of the piston around the tie 4. Said bore constitutes with said tie 4 a chamber 35 which communicates with the annular groove 33 via a conduit 34. Moreover, the tie 4 comprises an axial channel 36 which communicates with the chamber 35 via a conduit 37. The said channel 36 is connected to a fluid outlet.

The engine then functions as follows.

In the position of the piston which is illustrated in FIGS. 1 to 4, the motive fluid is admitted into the chamber 22 via the chamber 15, the conduit 17, the groove 19 and the conduit 21. It is let out through the conduits 28 and 29. The conduit 29 issuing on to the lower face of the piston in the chamber 2a, the motive fluid then pushes the piston towards the top of FIGS. 1, 3 and 4.

The fluid which is in the upper chamber 2b is removed through the conduits 30 and 31 and taken to the chamber 22 where the piston valve 22a allows the fluid to flow through the conduit 32 towards the annular groove 33. Through the conduit 34, the fluid is directed towards the annular chamber 35 which surrounds the column 4 and flows through the axial channel 36 which communicates with the chamber 35 via the conduit 37.

When the piston 6 is in top position (FIG. 5), the slide valve 38 is pushed downwards and creates a communication between the grooves 33 and 42. Groove 42 is connected to the lower zone of chamber 22 through conduit 48. Moreover, the relaying piston 26 is also pushed downwards against the spring 49; thus creating a communication between the conduits 23 and 45 and as a result between the grooves 18 and 41.

The motive fluid contained in the channel 18 thus passes into the groove 41 and feeds the upper zone of the chamber 22 via the conduit 47. The slide valve 22a is then pushed downwards and takes the position illustrated in FIG. 6. Said slide valve creates a communication between the conduit 30 and the groove 18 and between the conduit 29 and the groove 33, thus allowing the motive fluid to be admitted into the upper chamber 2b and to be removed from said chamber through the bore 36. Immediately the piston moves away from the upper wall of the chamber 2, the relaying piston 26 resumes its rest position due to the spring 49.

It will be noted that once the movement of the piston 6 has been reversed, the slide valves 22a and 38 are held in their new position by the action of the differential pressure existing between the two chambers.

The invention is not limited to the description given hereinabove but on the contrary covers any variants. For example, FIG. 7 illustrates a variant in which the supply of the motive fluid is effected in the same way as its exhaust.

The tie 5 comprises an axial channel 50 which communicates via a transverse conduit 51 with an annular chamber 52 provided in the piston 6 and surrounding the column 5, the chamber 52 communicating via conduits 53 and 54 with the grooves 18 and 19.

The other members are similar to those shown in FIGS. 1 to 6, and the functioning is the same as that described hereinabove.

Figure 7:
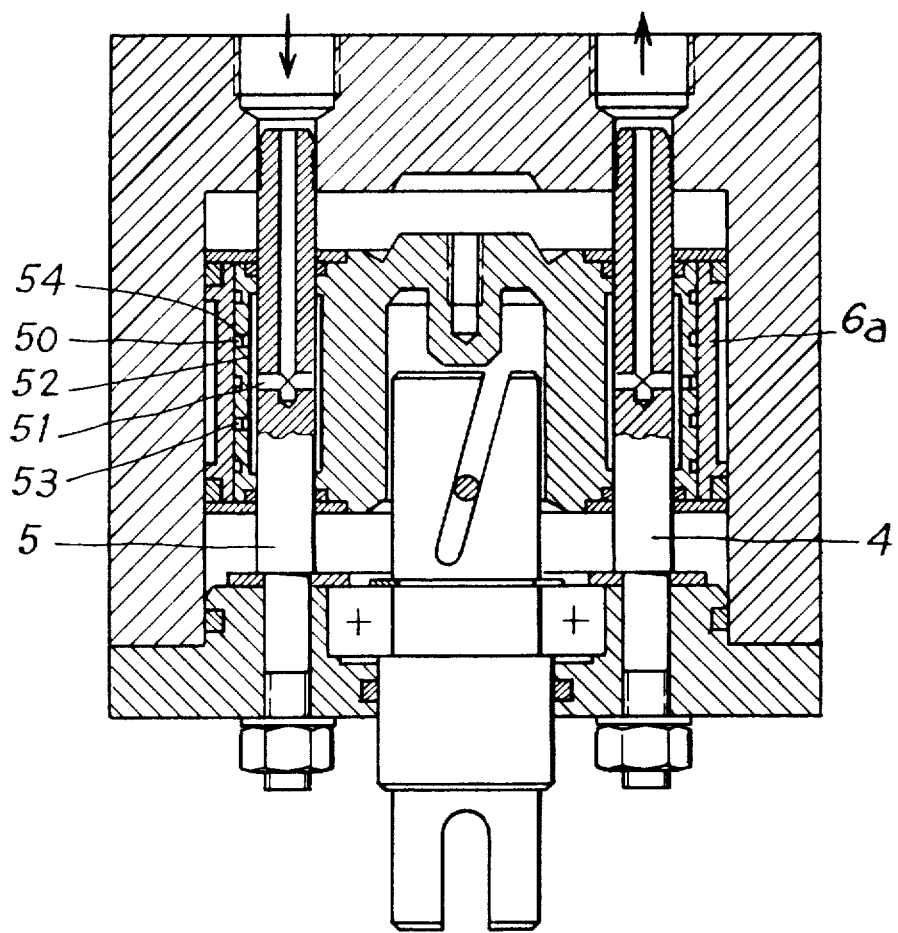
FIG. 7 is a similar view to that of FIG. 1, but showing a variant embodiment of the fluid supply pipe.

A further variant, not shown, would consist in creating a similar fluid supply to that shown in FIG. 7 and an exhaust similar to the supply shown in FIGS. 1 to 6. In this last case, the annular groove 33 would communicate with the annular chamber 15 situated on the outer periphery of the sleeve 6a and the exhaust channel 36 would be situated in the body 1 of the engine.

As shown in FIG. 8, the engine object of the invention can be coupled to a self-cleaning filter which comprises a filter proper 55 composed of a stack of filtering disks. The liquid to be filtered, admitted through the conduit 61, flows through a central passage in which rotates a slide-valve 56 which is driven by the shaft 11 of the engine and isolates a series of chambers to allow them to be washed against the flow. This type of filter is similar to that described in French Pat. No. 71 18275 already cited herein. The slide valve sends the washing fluid through its central channel 57 towards a second filter 58 which is also constituted by a stack of filtering disks operating in reverse to the filter 55. The washing fluid to be filtered is indeed admitted from the outside to the filter 55 and the filtered fluid comes out from the central passage wherefrom it is removed via a conduit 59 towards the reservoir. It should however be pointed out that the supply pipe 13 of the engine is connected to the conduit 59 and that a restriction 62 is provided downstream of the conduit 14, thus permitting to have enough pressure to actuate the engine. One part of the filtered washing fluid is therefore used to drive the piston 6 in the conditions explained above, which causes the alternate rotation of the shaft 7 itself causing the unidirectional rotation of the shaft 11 coupled to the rotary valve 56. The housing of the fluid filter is provided with a plug 60 permitting the removal of any sludges depositing in said housing after the washing of the filtering elements of the filter 58.

The term "drive means" as used in the appended claims is intended to refer broadly to the slide valve 38, and in a narrower sense to this slide valve 38 in combination with pistons 26, 27 and piston valve 22a.

What is claimed is:

1. Hydraulic engine used in particular to drive a self-cleaning filter, which engine comprises a piston moving with an automatically controlled reciprocate motion, inside a cylinder into the walls of which issue a pressurized hydraulic fluid supply pipe and an exhaust pipe for said hydraulic fluid, said piston defining with the cylinder two chambers to receive the hydraulic fluid and comprising drive means parallel to the piston axis and sliding in said piston, said drive means ensuring the selective and successive communication of the supply pipe and exhaust pipe with each one of the chambers, via conduits provided inside the piston, said piston comprising a central core and a sleeve mounted in sealed manner on said core, said core being provided on its periphery with at least three annular grooved portions forming with the inside wall of the sleeve three annular fluid-tight grooves, the middle groove being in permanent communication with the exhaust pipe and the two adjacent grooves being in permanent communication with the supply pipe, whereas the middle groove and one of the two adjacent grooves are selectively and respectively connected with the two chambers of the cylinder via a slide valve mounted in the piston and forming part of said drive means, said valve comprising outlets respectively connected to the two chambers via conduits provided in the core of the piston and issuing on to each of the faces thereof.

2. The engine of claim 1, wherein the outer wall of the sleeve of the piston is provided with an annular groove which defines with the inside wall of the cylinder an annular chamber into which issues the supply conduit.

3. The engine of claim 1, wherein a column or tie, along which slides the piston, is provided with an axial conduit which constitutes the supply conduit, the piston being provided with an annular groove which constitutes with the tie a chamber into which issues a further conduit connected to the axial conduit, and said chamber communicating with the annular grooves adjacent the middle groove, via additional conduits.

4. The engine of claim 1, wherein at least a tie, along which slides the piston, is provided with at least an axial channel constituting the exhaust channel, the piston being provided with an annular groove which constitutes with the tie an annular chamber into which issues a conduit connected to the axial channel, and said chamber communicating with the middle groove via a further conduit.

5. The engine of any one of claims 2 to 4, wherein the piston slide valve moves inside a chamber provided in the core of the piston and wherein the control of said piston slide valve comprises two conduits situated respectively at each end of the chamber adapted to communicate selectively with the supply channel.

6. The engine of any one of claims 2 to 4, wherein the piston slide valve moves inside a chamber provided in the core of the piston and wherein the control of said piston slide valve comprises two conduits situated respectively at each end of the chamber adapted to communicate selectively with the supply channel, and further wherein the core of the piston comprises two further grooved portions which, with the sleeve, constitute two further annular grooves communicating with said two conduits of the chamber of the piston slide valve, and said drive means also including a selector, comprising a slide valve sliding in the piston and partly on the outside thereof, and comprising an assembly consisting of two relaying pistons, and projecting partly outside the piston, ensuring selective and successive communication of said further annular grooves with one of the two annular grooves and with the middle groove.

* * * * *